United States Patent
Herman (10) Patent No.: US 12,096,119 B2
(45) Date of Patent: Sep. 17, 2024

(54) LOCAL COMPUTE CAMERA CALIBRATION

(71) Applicant: FORD GLOBAL TECHNOLOGIES, LLC, Dearborn, MI (US)

(72) Inventor: David Michael Herman, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/817,530

(22) Filed: Aug. 4, 2022

(65) Prior Publication Data

US 2024/0048843 A1 Feb. 8, 2024

(51) Int. Cl.
| | |
|---|---|
| H04N 23/90 | (2023.01) |
| G06T 7/80 | (2017.01) |
| H04N 7/18 | (2006.01) |
| H04N 9/73 | (2023.01) |
| H04N 23/667 | (2023.01) |
| H04N 23/698 | (2023.01) |

(52) U.S. Cl.
CPC ........... *H04N 23/667* (2023.01); *H04N 7/181* (2013.01); *H04N 9/73* (2013.01); *B60R 2300/303* (2013.01); *B60R 2300/402* (2013.01); *G06T 7/80* (2017.01); *H04N 23/698* (2023.01); *H04N 23/90* (2023.01)

(58) Field of Classification Search
CPC .. H04N 23/698; H04N 23/90; G06T 7/80–97; B60R 2300/303; B60R 2300/402
USPC .................................................... 348/207.99
See application file for complete search history.

(56) References Cited

U.S. PATENT DOCUMENTS

| | | | |
|---|---|---|---|
| 9,495,876 B2 | 11/2016 | Lu et al. | |
| 10,834,221 B2 | 11/2020 | Tong et al. | |
| 10,972,704 B2 * | 4/2021 | Carey | H04W 8/005 |
| 11,025,859 B2 | 6/2021 | Ziegenspeck et al. | |
| 11,048,498 B2 | 6/2021 | Malladi et al. | |
| 2009/0002491 A1 * | 1/2009 | Haler | H04N 5/76 348/148 |
| 2012/0218412 A1 * | 8/2012 | Dellantoni | G01C 21/3679 348/148 |
| 2018/0043828 A1 | 2/2018 | Lu et al. | |
| 2021/0176455 A1 * | 6/2021 | Naidu | G06T 5/80 |

(Continued)

OTHER PUBLICATIONS

Influx Technology, "CAN Bus VS Ethernet—A Simple Guide | Learn the Difference," Jun. 2022, https://www.influxbigdata.in/post/can-bus-vs-ethernet-protocol-simple-explanation.*

*Primary Examiner* — Anthony J Daniels
(74) *Attorney, Agent, or Firm* — Frank Lollo; Brooks Kushman P.C.

(57) ABSTRACT

Utilizing local camera compute for camera calibration is provided. Perception outputs are generated, by respective camera processors of each of a plurality of cameras, the perception outputs indicating properties of calibration references located in raw images captured by the respective camera. In a calibration mode, a camera controller, in communication with the plurality of cameras over a data bus, receives the perception outputs from the plurality of cameras. In a runtime mode, the camera controller utilizes calibration data generated based on the perception outputs to fuse compressed images received from the plurality of cameras over the data bus into a combined surround view.

17 Claims, 7 Drawing Sheets

(56) References Cited

U.S. PATENT DOCUMENTS

| | | | |
|---|---|---|---|
| 2022/0207756 A1* | 6/2022 | Ren | G06T 7/60 |
| 2022/0237824 A1* | 7/2022 | Li | G06T 5/006 |
| 2022/0342054 A1* | 10/2022 | Katou | G01S 17/931 |
| 2023/0032613 A1* | 2/2023 | Duan | G06T 3/4038 |
| 2023/0095500 A1* | 3/2023 | Cheng | G06T 7/74 |
| | | | 348/143 |
| 2023/0186518 A1* | 6/2023 | Chou | G06T 7/80 |
| | | | 382/103 |

* cited by examiner

LOCAL COMPUTE CAMERA CALIBRATION

TECHNICAL FIELD

Aspects of the disclosure generally relate to networked cameras including local compute for use in camera calibration.

BACKGROUND

A surround view monitor may stitch together an isometric or top-down view of a vehicle from a set of cameras mounted about the vehicle. For example, a vehicle may include a front facing camera, a rear facing camera, and cameras on either side of the vehicle. Images from these cameras may be mathematically transformed from their individual fields of view into a common world plane. Once transformed, this view may be used for tasks such as parking assistance.

SUMMARY

In one or more illustrative examples, a system for utilizing local camera compute for camera calibration is provided. The system includes a plurality of cameras, each of the cameras including a respective camera processor programmed to generate perception outputs indicating properties of a calibration reference located in a raw image captured by the respective camera. The system also includes a camera controller, in communication with the plurality of cameras over a data bus. The camera controller is programmed to: in a calibration mode, receive the perception outputs from the plurality of cameras over the data bus, and in a runtime mode, utilize calibration data generated based on the perception outputs to fuse compressed images received from the plurality of cameras over the data bus into a combined surround view.

In one or more illustrative examples, a method for utilizing local camera compute for camera calibration is provided. Perception outputs are generated, by respective camera processors of each of a plurality of cameras, the perception outputs indicating properties of calibration references located in raw images captured by the respective camera. In a calibration mode, a camera controller, in communication with the plurality of cameras over a data bus, receives the perception outputs from the plurality of cameras. In a runtime mode, the camera controller utilizes calibration data generated based on the perception outputs to fuse compressed images received from the plurality of cameras over the data bus into a combined surround view.

In one or more illustrate examples, a camera utilizing local compute for camera calibration includes a camera processor. The camera processor is programmed to receive a message over a data bus from a camera controller, the message instructing the camera processor to enter a calibration mode, receive, from the camera, a raw image, locate a calibration reference in the raw image, identify features of the calibration reference, and send, over the data bus to the camera controller, perception outputs indicating the features to the camera controller, without sending the raw image over the data bus to the camera controller.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present approach.

Camera calibration may be performed by imaging a reference pattern or object and analyzing the raw image to determine camera parameters. In an example, the reference pattern may be a checkerboard illustration placed in the field of view of the camera. The location of the illustration may be identified, corners of the checkerboard may be identified, and sub-pixel corner locations of the corners may be predicted. These locations may be used to help with aligning images from multiple cameras together when building a fused image. Other reference patterns may be used for different calibrations, such as color patterns, street signs, etc.

In some implementations, the camera may be connected to a remote processor over a data connection, such as an Ethernet bus, a cellular vehicle-to-everything (C-V2X) connection, a local Internet service provider (ISP) connection, etc. To reduce data usage over the bus, the camera may provide a compressed version of the raw image to the remote processor, or even a count of detected objects where the data bandwidth is far lower than the camera's raw data collection. Unfortunately, this encoding of the raw image into a compressed image may degrade or remove the fine details required by the calibration algorithms to calibrate the camera. This may result in reduced sub-pixel accuracy or poor photometric color calibration. Such a degraded calibration may result in poor synthesized image fusion and alignment.

An improved system may utilize cameras containing edge compute capability. This edge compute may include a processor integrated into the camera and configured to perform the calibration. The camera processor may contain sufficient computing power for the portion of the calibration process executed on-camera. For instance, the edge compute may include processing power sufficient to locate calibration references in raw image data, detect features of the calibration references, and predict the sub-pixel locations of those features in the calibration references. As these operations may be performed on-camera, the raw image may be used without adding load to the data bus.

A camera controller in communication with the cameras over a data bus may be configured to send a command to the cameras to enter a calibration mode. The calibration mode may be performed instead of, or in parallel with, normal imaging. In the calibration mode, the cameras may detect the features, color, polarimetry, depth, camera pose, camera location and other properties on the uncompressed raw images produced by the cameras. The camera processor may provide the perception outputs and a compressed video output to the camera controller. In some examples, the information to capture by the cameras may be predefined. In other examples, the controller may share what features and/or targets to capture with the cameras. The camera controller may complete the calibration across the cameras using the perception outputs. Thus, compressed image data may be sent via the data connection, while still retaining the accuracy of performing the calibration on the raw image data.

Figure 1:
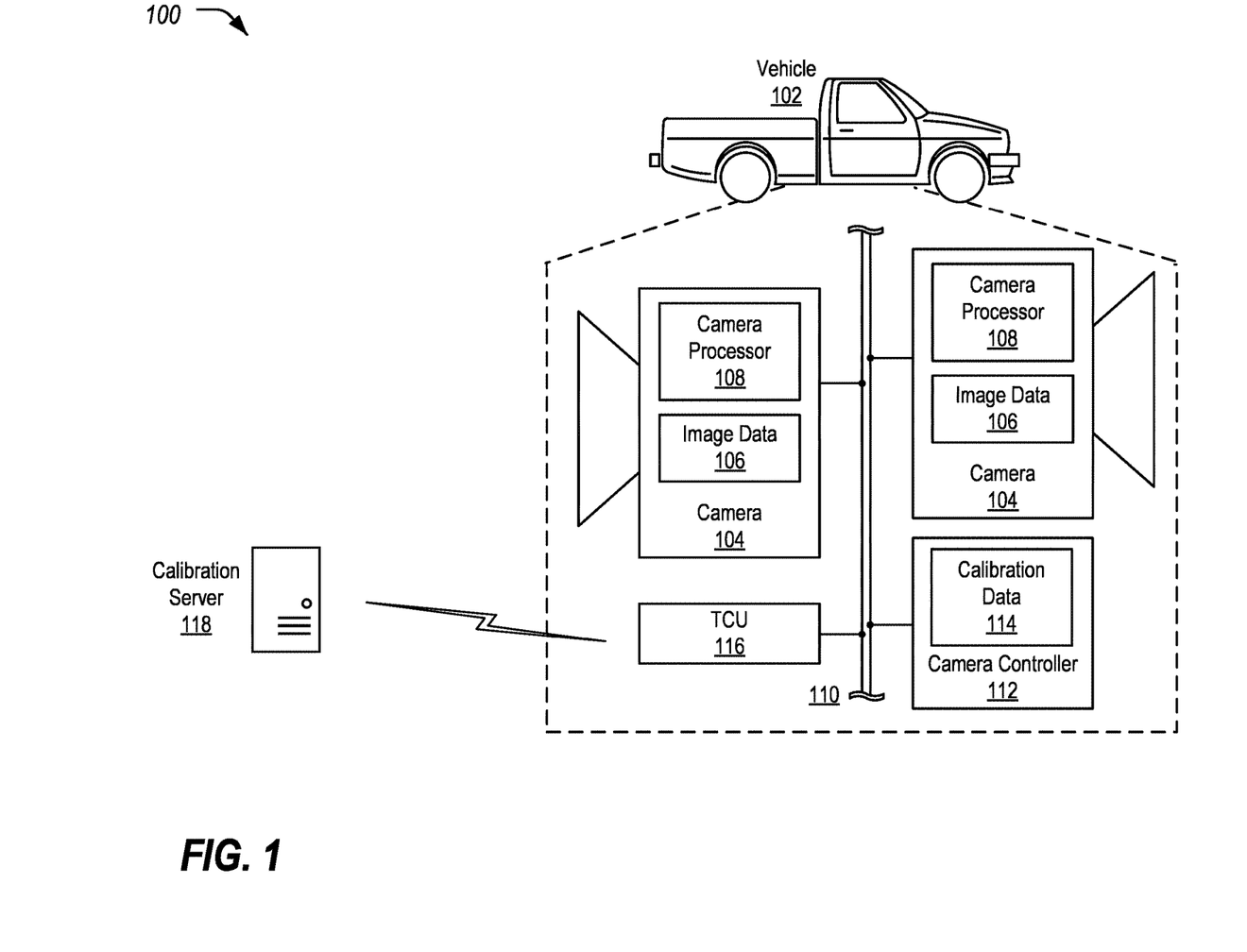
FIG. 1 illustrates an example system for a vehicle configured to utilize networked cameras with local compute for camera calibration.

FIG. 1 illustrates an example system 100 for a vehicle 102 configured to utilize networked cameras 104 with local compute for camera 104 calibration. The vehicle 102 may include a plurality of cameras 104, each having an integrated camera processor 108. The vehicle 102 may also include a camera controller 112 in communication with the cameras 104 over one or more data connections 110. A telematics control unit (TCU) 116 may also be connected to the one or more data connections 110. While an example system 100 is shown in FIG. 1, the example components as illustrated are not intended to be limiting. For instance, although two cameras 104 are shown in the example system 100, this is solely for sake of illustration and in many examples the vehicles 102 may include four or more cameras 104.

The vehicle 102 may include various types of automobile, crossover utility vehicle (CUV), sport utility vehicle (SUV), truck, jeepney, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors. In another example, the vehicle 102 may be a pure electric vehicle driven by electric motors.

The cameras 104 may include one or more imaging devices configured to capture image data 106, such as visible light sensors, infrared sensors, light detection and ranging (LIDAR) sensors, radio detection and ranging (RADAR) sensors, etc. This image data 106 may, for example, be taken of the surroundings of the vehicle 102. The image data 106 may be taken with various spatial resolutions (e.g., SD, HD, full-HD, UHD, 4K, etc.), frame rate (15, 24, 30, 60, 120 frames per second, etc.), dynamic ranges (8 bits, 10 bits, 12 bits per pixel per color, etc.), and/or color channels (RGB, monochrome, etc.). Further the cameras 104 may capture information regarding depth, e.g., based on direct and indirect time of flight. Alternatively, the cameras 104 may capture information as a sequence of events. As another example, the cameras 104 may incorporate active illumination to image the area around the vehicle 102 or utilize ambient illumination. In the case of an active illumination camera, a doppler shift of the returned light may be measured to compose the image data 106. To achieve greater coverage of the area surrounding the vehicle 102 for the quantity of cameras 104 used, wide-area cameras 104 may be used having a greater field of view, such as 60 degrees, 100 degrees, or 150 degrees, or even 170 degrees or more. Multiple wide-area cameras may be used to improve the data quality of the scene, e.g., spherical camera systems, multi-view stereo systems, etc.

In some examples, the cameras 104 may further capture additional information apart from image data 106 that may be useful for the calibration. In an example, this additional information may include, acceleration data indicative of the movement of the camera 104, date and time at which the image is captured, geographic location at which the camera 104 is located, etc.

The cameras 104 may include a front facing camera 104 such as in the grille, a rear facing camera 104 that may also function as a back-up camera 104, and cameras 104 on either side of the vehicle 102 such as placed in the exterior rear-view mirror areas. In another example, a six camera 104 system may further include side-view cameras 104 positioned ahead of the front wheels to provide further information with respect to potential obstacles in front of the front wheels.

Each of the cameras 104 may include a camera processor 108. The integrated camera processor 108 may be configured to provide edge compute capacity to the cameras 104. The integrated camera processor 108 may be configured to provide computing power to perform processing at the camera processor 108, without reliance on controllers connected to the camera 104 via a data connection 110. Thus, the camera processor 108 may be used without generating data traffic on the data connections 110.

The data connections 110 may include various methods of communication available between the cameras 104, as well as between the TCU 116 and the camera controller 112. As some non-limiting examples, the data connections 110 may include buses such as one or more of a vehicle controller area network (CAN), an Ethernet network, a media-oriented system transfer (MOST) network. As some further non-limiting examples, the data connections 110 may include vehicle to vehicle or infrastructure wireless connections, such as dedicated short range communication (DSRC) and/or C-V2X. An example of a use case for a wireless connection may be the use of a wireless trailer camera 104, or the use of cameras 104 of other vehicles or even infrastructure in a smart city.

The camera controller 112 may be configured to communicate with the plurality of cameras 104. In some examples, the camera controller 112 may be a device in communication with each of the other cameras 104 over one or more of the data connections 110. In other examples, the camera controller 112 may include one or more devices in a looser association with at least a subset of the cameras 104, such as one or more processing devices in a smart city device network in communication with the cameras 104 over various data connections 110.

The camera controller 112 may be configured to perform operations that combine the image data 106 taken from the cameras 104 for various uses. In an example, the camera controller 112 may implement a surround view monitor by stitching together an isometric or top-down view around the vehicle 102 from the image data 106 received from the cameras 104. Image data 106 from these cameras 104 may be mathematically transformed from their individual fields of view into a single combined view. This transformation may simply be a two-dimensional (2D) projection onto a surface (e.g., 2D or three-dimensional (3D), where the pixels are mapped from one surface to another. Or, this transmigration may include a mapping to 3D space where each pixel value is rendered from depth information obtained or calculated, rather than assumed to be in a plane.

The camera controller 112 may utilize calibration data 114 to aid in the combination of the image data 106 from the cameras 104. For instance, the camera controller 112 may utilize geometric parameters (such as camera pose, camera localization, intrinsic/extrinsic parameters, and distortion parameters, etc.) of the cameras 104 from the calibration data 114 to perform geometric alignment of the image data 106 from the different cameras 104. In another example, the camera controller 112 may utilize photometric parameters of the cameras 104 from the calibration data 114 to perform photometric alignment of the image data 106 from the different cameras 104.

The TCU 116 may include network hardware configured to facilitate communication between the vehicle 102 and other devices of the system 100. For example, the TCU 116 may include or otherwise access functionality to facilitate communication with devices over a cellular communications network. In another example, the TCU 116 may include or otherwise access functionality to facilitate communication with devices over a local connection, such as Wi-Fi, BLUETOOTH, etc.

A calibration cycle may be performed to allow the camera controller 112 to capture the calibration data 114. In an example, the camera controller 112 may be configured to issue a command to the cameras 104 to enter a calibration mode. In some cases, the TCU 116 may be in communication with a calibration server 118, where the calibration server 118 is configured to instruct the camera controller 112 to direct the cameras 104 enter the calibration mode. This instruction may be sent, for example, responsive to placement of the vehicle 102 in a testing environment.

Figure 2:
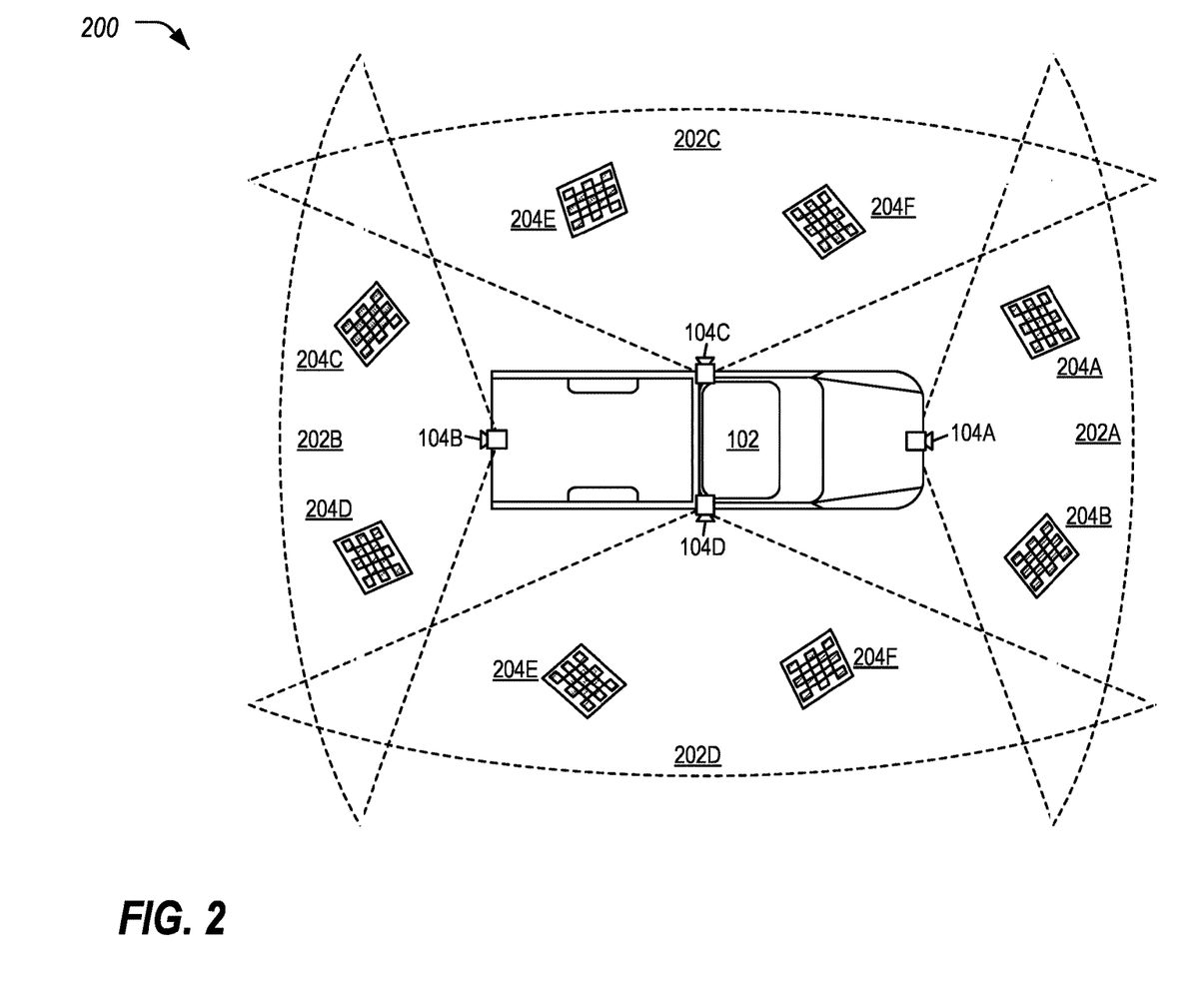
FIG. 2 illustrates an example of a testing environment for the calibration of the cameras of the vehicle.

FIG. 2 illustrates an example 200 of a testing environment for the calibration of the cameras 104 of the vehicle 102. As shown, the example vehicle 102 has four cameras 104, a front-facing camera 104A having field-of-view 202A, a rear-facing camera 104B having field-of-view 202B, a left-side camera 104C having field-of-view 202C, and a right-side camera 104D having field-of-view 202D.

Calibration references 204 are placed in the fields-of-view 202A-D of the cameras 104A-D. For instance, calibration references 204A-B are placed in the field-of-view 202A of the camera 104A, calibration references 204C-D are placed in the field-of-view 202B of the camera 104B, calibration references 204E-F are placed in the field-of-view 202C of the camera 104C, and calibration references 204G-H are placed in the field-of-view 202D of the camera 104D. In this specific example, the calibration references 204 are accordingly placed where a share field of view (FOV) overlap between the cameras 104 may be performed.

The calibration references 204 may include patterns useful for determining parameters of the operation of the camera 104. These parameters may be used to generate the calibration data 114. In an example, the calibration reference 204 may include a checkerboard pattern with a predefined color profile (e.g., a black and white checkerboard), although other patterns and colorations are possible. In another example, objects in a scene where prior knowledge on their properties is available (e.g., lane lines, street signs, etc. from 2D or 3D map data) may be used to perform calibration.

Figure 3:
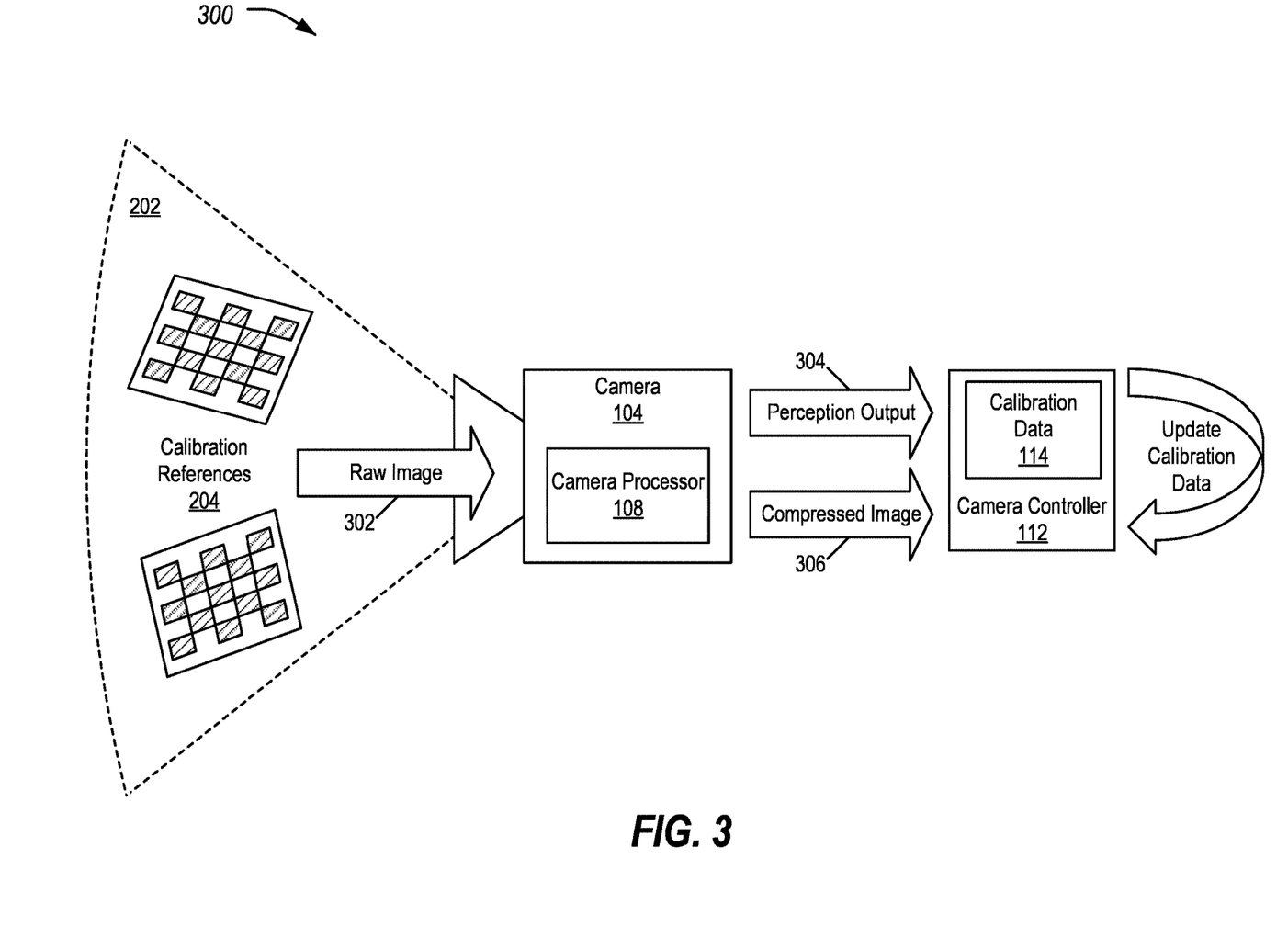
FIG. 3 illustrates an example diagram of the operation of one of the cameras and the and the camera controller in the calibration mode.

FIG. 3 illustrates an example diagram 300 of the operation of one of the cameras 104 and the camera controller 112 in the calibration mode. As shown, in the calibration mode the camera 104 may capture a raw image 302 of calibration references 204. For ease of illustration, the diagram 300 shows a single camera 104 processing a two calibration references 204. However, it should be noted that the calibration mode may be perform by multiple cameras 104 under the direction of the camera controller 112, and further that each camera 104 may view a different quantity of calibration references 204 than shown.

The raw image 302 may refer to the unprocessed (or minimally processed) digital image of the image data 106 captured by the image sensor of the camera 104. The raw image 302 may include significantly more detail, such as a wider color range and a lossless representation of the data captured by the camera 104, as compared to compressed file types such as Joint Photographic Experts Group (JPEG) or H.264. However, the raw image 302 may consume far more data storage as compared to such compressed file types.

The camera 104 may utilize the camera processor 108 to detect features, color, and other properties of the calibration reference 204 captured in the raw image 302. In an example, the camera processor 108 may receive the raw image 302 and detect the location of the calibration reference 204 in the raw image 302. The location of the calibration reference 204 may be identified using an object recognition model (such as the YOLOX object detector in an example), although other object recognition models and approaches may be used.

Using the location of the calibration reference 204, the camera processor 108 may detect the locations of features in the calibration reference 204. In the example of a checkerboard pattern calibration reference 204, the features may be the corners within the checkerboard pattern. The corners may be located using an algorithm such as the Harris corner algorithm, although other approaches may be used. The sub-pixel corner locations of the corner may then then be identified. For instance, a centroid may be determined for each identified corner to be used as the sub-pixel location of the corner. The result of the detection, in this example the sub-pixel corner locations, may be included in perception output 304.

The camera processor 108 may perform further detections on the calibration reference 204 as well. For instance, the camera processor 108 may perform a detection of photometric color features to allow for differences in how colors are captured to be identified. These parameters may also be included in the perception output 304. It should be noted that the examples of detected features are not intended to limiting, and other types of calibration references 204 and features that may be used for calibration may be detected.

The camera 104 may also compress the raw image 302 into a compressed image 306. This compression may be performed to allow for the image data 106 to be sent more easily over the data connections 110, e.g., without exceeding bandwidth limits of the data connections 110. The raw image 302 may be compressed using any of various image compression algorithms such as JPEG, H.264, neural network based compression, etc. The camera 104 may also perform other local processing, such as perception, and provide an algorithm output such as object detections (e.g., pedestrian located at bounding box located at pixel coordinates . . . ).

The camera 104 may provide the perception output 304 and the compressed image 306 to the camera controller 112 over the data connections 110. The camera controller 112 may receive the perception output 304 and the compressed image 306. Using the perception output 304 from each of the cameras 104, the camera controller 112 may be configured to calibrate the surround view monitor or other view that utilities a combination of the images from the cameras 104. For instance, the sub-pixel feature locations from the perception output 304 may be used to perform geometric alignment between the cameras 104. As another possibility, the photometric color features from the perception output 304 may be used to perform photometric alignment between the cameras 104.

Significantly, while the compressed image 306 is sent via the data connections 110, the overall approach retains the accuracy of performing the calibration on the raw image 302 as the perception output 304 is determined by the camera processor 108 using the raw image 302.

Figure 4:
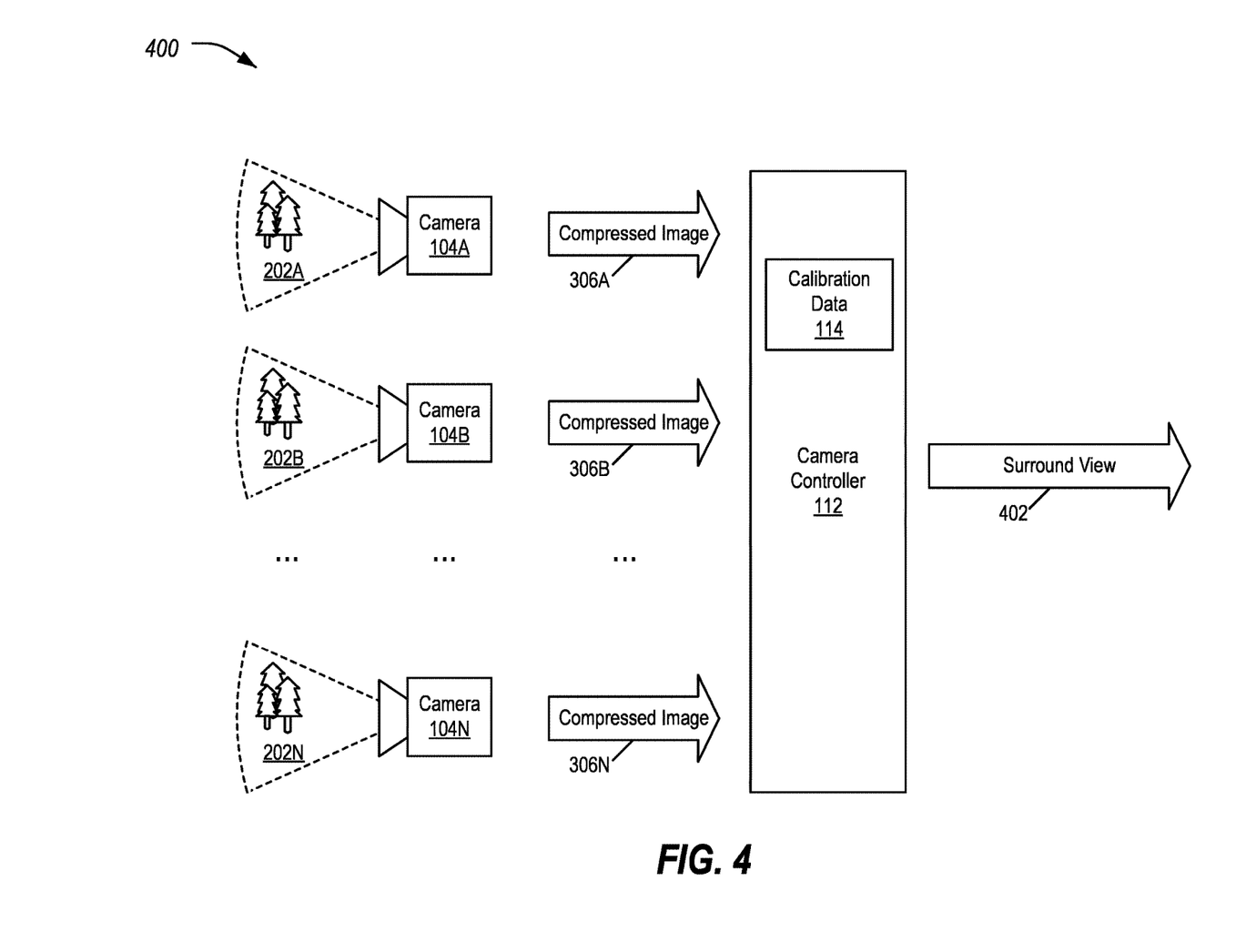
FIG. 4 illustrates an example diagram of the operation of the cameras and the camera controller in the runtime mode.

FIG. 4 illustrates an example diagram 400 of the operation of the cameras 104 and the camera controller 112 in the runtime mode. The runtime mode, as used herein, may refer to when the system 100 is not in the calibration mode. As shown, the camera controller 112 may receive compressed images 306A-N from each of the cameras 104A-N. Utilizing the calibration data 114 computed during the calibration mode, the camera controllers 112 may transform the compressed images 306A-N into a surround view 402.

For instance, in the case of wide-angle cameras 104, the camera controller 112 may utilize fisheye camera parameters corresponding to the cameras 104 to perform lens distortion correction on the image data 106. The camera controller 112 may further perform ground image registration using the perspective-corrected images to create ground registered images in the same plane. The camera controller 112 may then perform object registration in the ground registered images to identify objects in common between the ground registered images. The camera controller 112 may then perform perspective mapping to map the compressed images 306A-N into the single combined surround view 402, such as a top-down view around the vehicle 102. Once transformed, the combined surround view 402 may be used for tasks such as display to assist in backing up or parking. In some examples, a predefined image of the vehicle 102 itself may be superimposed at the center of the surround view 402 to aid the user in understanding where the vehicle 102 is located relative to the surroundings.

Figure 5:
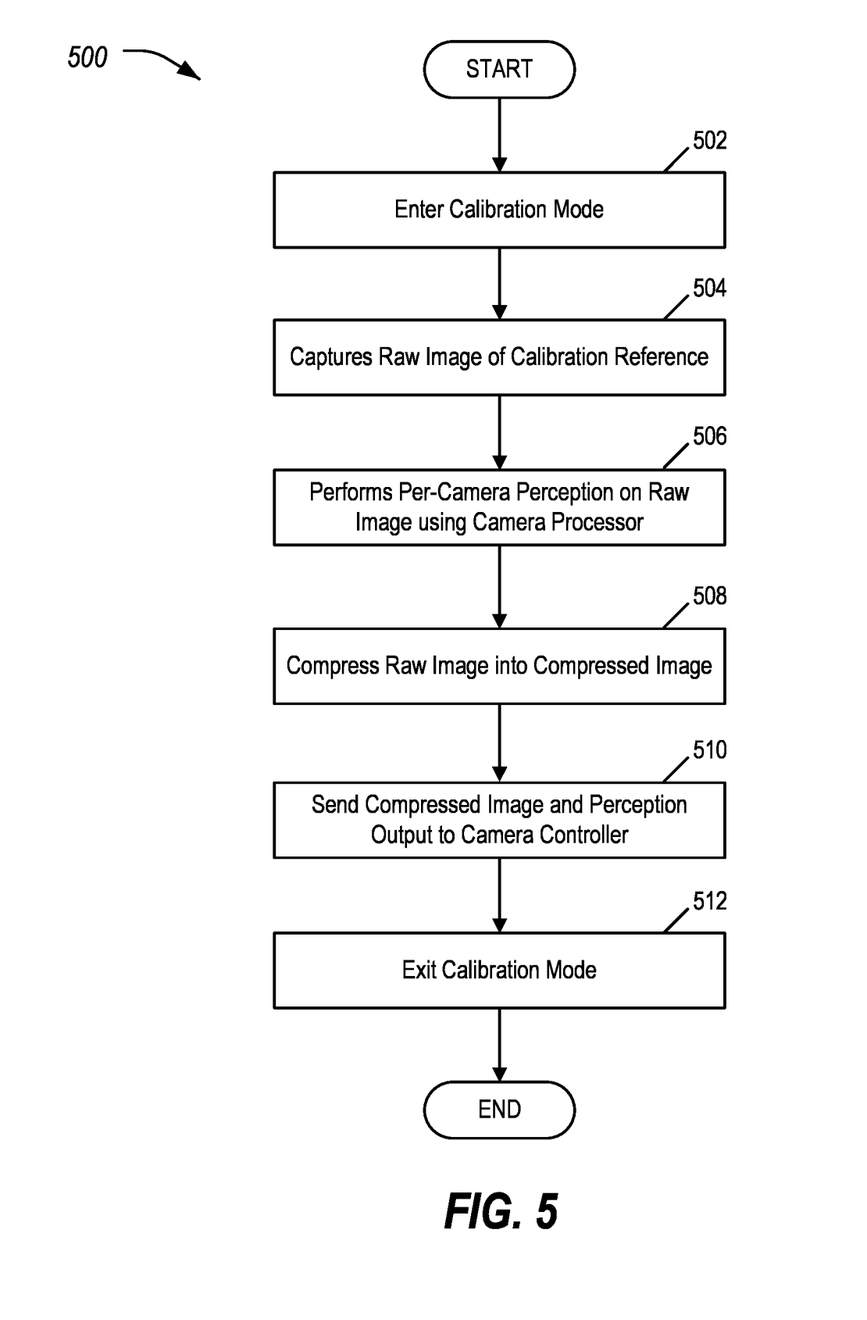
FIG. 5 illustrates an example process for operation of the calibration mode by the cameras.

FIG. 5 illustrates an example process 500 for operation of the calibration mode by the cameras 104. In an example, the process 500 may be performed by each of the cameras 104 in the context of the system 100.

At operation 502, the camera 104 enters the calibration mode. In an example, the camera 104 may receive a message from the camera controller 112 over the data connections 110 instructing the camera 104 to enter the calibration mode. In some examples, the message may include credentials or other authentication of the camera controller 112 to invoke the calibration mode.

At operation 504, the camera 104 captures a raw image 302 of one or more calibration references 204. The calibration references 204 may include a checkerboard illustration or other features placed in the field of view 202 of the camera 104.

At operation 506, the camera 104 performs per-camera perception on the raw image 302 using the camera processor 108. In an example, the camera processor 108 may produce the perception output 304 as discussed in detail above. Significantly, this perception output 304 may be produced by the camera processor 108 without sending the raw image 302 data over the data connections 110.

At operation 508, the camera 104 compresses the raw image 302 into a compressed image 306. In an example, the camera processor 108 may compress the raw image 302 into a format such as JPEG or H.264, to allow for the compressed image 306 to more easily be send to the camera controller 112 over the data connections 110. At operation 510, the camera 104 sends the compressed image 306 and the perception output 304 to the camera controller 112. This may be accomplished over the data connections 110.

At operation 512, the camera 104 exits the calibration mode. In an example, the camera 104 may receive a message from the camera controller 112 over the data connections 110 instructing the camera 104 to exit the calibration mode. In another example, the camera 104 may automatically exit the calibration mode responsive passage of a predefined period of time and/or responsive to sending the perception output 304 to the camera controller 112. After operation 512, the process 500 ends.

Figure 6:
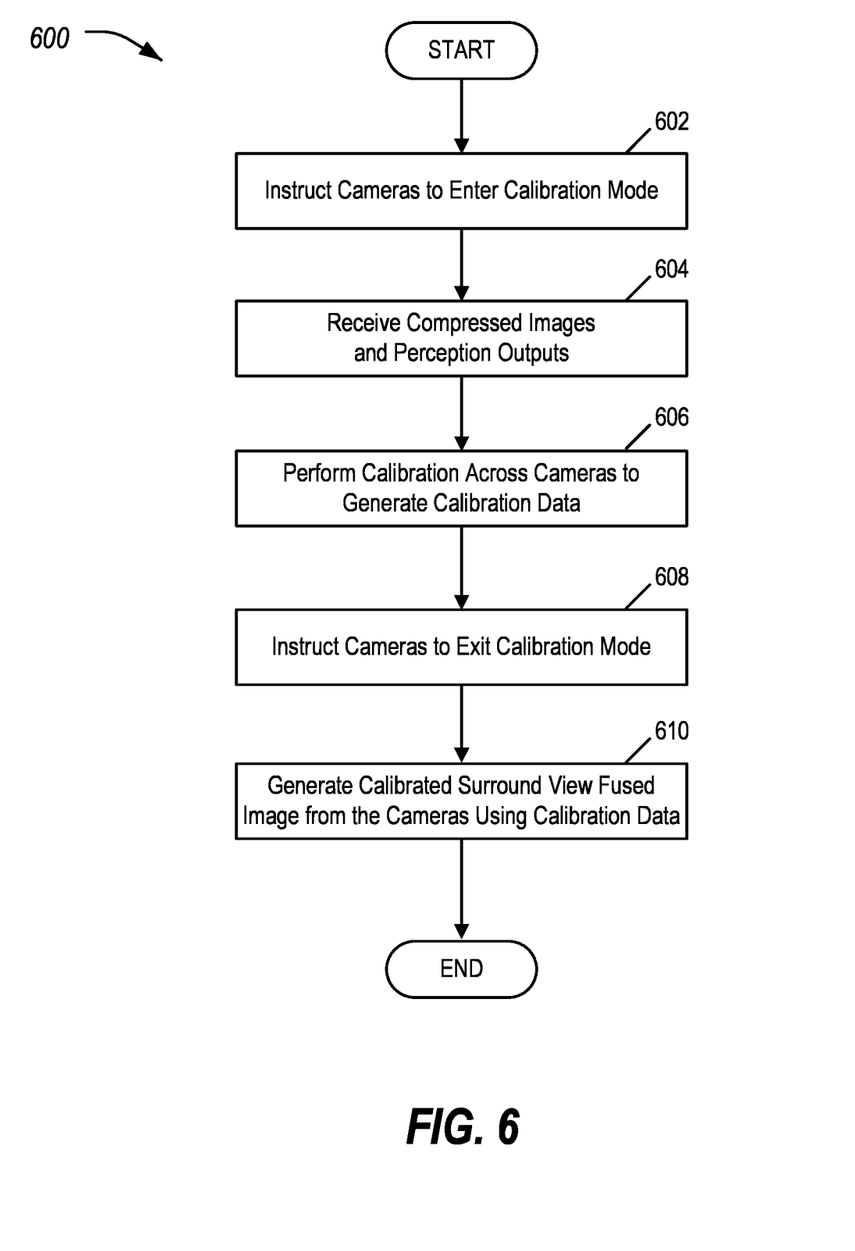
FIG. 6 illustrate an example process for operation of the camera controller for the calibration of the cameras; and calibration.

FIG. 6 illustrate an example process 600 for operation of the camera controller 112 for the calibration of the cameras 104. In an example, the process 600 may be performed by the camera controller 112 in the context of the system 100 including a plurality of cameras 104 each having respective camera processors 108.

At operation 602, the camera controller 112 instructs the cameras 104 to enter the calibration mode. In an example, the TCU 116 may receive a message from the calibration server 118 instructing the vehicle 102 to enter the calibration mode. This message may be communicated from the TCU 116 to the camera processor 108 from the TCU 116 over the data connections 110. Responsive to receipt of the message, as noted at operation 502, the camera controller 112 may send the cameras 104 messages over the data connections 110 to cause the cameras 104 to enter the calibration mode.

At operation 604, the camera controller 112 receives compressed images 306 and perception outputs 304 from the cameras 104. These compressed images 306 and perception outputs 304 may be received from each of the cameras 104, as discussed with respect to operations 504-510 of the process 500.

At operation 606, the camera controller 112 performs the calibration across the cameras 104 to generate the calibration data 114. Accordingly, the camera controller 112 may update the calibration data 114 parameters for geometry, color, etc., according to the received perception outputs 304.

At operation 608, the camera controller 112 instructs the cameras 104 to exit the calibration mode. In an example, as noted in operation 512, the camera controller 112 may send messages over the data connections 110 instructing the cameras 104 to exit the calibration mode. This may be sent by the camera controller 112, in an example, responsive to completion of the calibration performed at operation 606.

At operation 610, the camera controller 112 generates a calibrated surround view 402 using the calibration data 114 and compressed images 306 from the cameras 104. The surround view 402 may be constructed as discussed above with respect to the diagram 400. After operation 610, the process 600 ends.

Thus, the camera controller 112 in communication with the cameras 104 over the data connections 110 may be configured to send a command to the cameras 104 to enter the calibration mode to detect the features, color, and other properties on the uncompressed raw images 302 produced by the cameras 104. The camera processor 108 may provide the perception outputs 304 and the compressed image 306 output to the camera controller 112. The camera controller 112 may complete the calibration across the cameras 104 using the perception outputs 304. Compressed image data 106 may be sent via the data bus, while still retaining the accuracy of performing the calibration on the raw image data 106.

Variations on the disclosed approaches are possible. In an example, the camera processor 108 may be further configured to perform lens distortion correction at the camera 104 side (rather than by the camera controller 112) but leaving the camera controller 112 to utilize the perception output 304 to perform the image fusion synthesis. In another variation, the camera 104 may output a calibration matrix as opposed to the sub-pixel locations of the features of the calibration reference 204. In yet another variation, the cameras 104 may provide the perception output 304 based on raw images 302 captured during driving of the vehicle 102 (e.g., using road features as the vehicle 102 drives down a straight road), without requiring the use of calibration references 204.

It should also be noted that the disclosed concepts utilizing the camera processor 108 for processing of local camera image data may also apply to a range of other sensor modalities, calibration related tasks (color vs registration vs temporal, etc.), and functional features (from viewpoint of software stack in autonomous vehicle (AV) or advanced driver assistance system (ADAS) or end customer related features, e.g. object detection vs imaging). For instance, one feature may use the calibrated compressed data stream to perform automated motion control where another may combine multiple images into a single projected image for human viewing.

As another example, the disclosed concepts may be applicable to use in cooperative perception. A multi-vehicle cooperative perception environment may require the integration of raw sensor data that may exceed the bandwidth of the data connections 110 between vehicles 102. In such a situation, the camera processors 108 may be configured to perform recognition, alignment, or other tasks such as development of point cloud data, where the results of those tasks are sent from the cameras 104 rather than raw data to ease congestion of the data connections 110.

Figure 7:
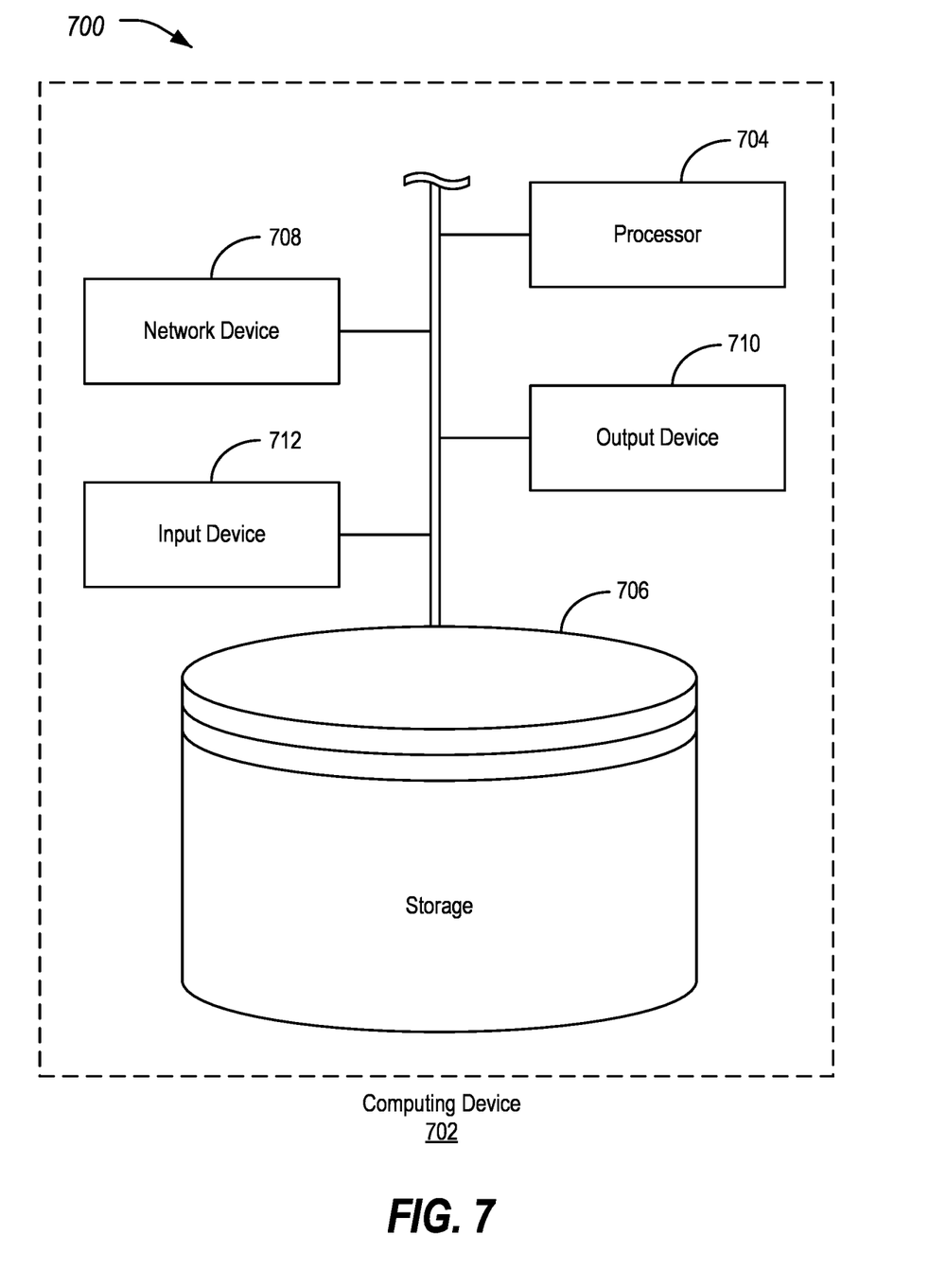
FIG. 7 illustrates an example computing device for performing aspects of the camera calibration.

FIG. 7 illustrates an example computing device 702 for performing aspects of the camera 104 calibration. Referring to FIG. 7, and with reference to FIGS. 1-6, the camera 104, camera processor 108, camera controller 112, and calibration server 118 may include examples of such computing devices 702. Computing devices 702 generally include computer-executable instructions that are executable by one or more computing devices 702. These computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the image data 106, calibration data 114, raw images 302, and compressed image 306, may be stored and transmitted using a variety of computer-readable media.

As shown, the computing device 702 may include a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as Peripheral Component Interconnect (PCI) express or another suitable peripheral data connection. In one example, the CPU is a commercially available processing device that implements an instruction set such as one of the x86, ARM, Power, or Microprocessor without Interlocked Pipeline Stages (MIPS) instruction set families.

Regardless of the specifics, during operation the processor 704 executes stored program instructions that are retrieved from the storage 706. The stored program instructions, accordingly, include software that controls the operation of the processors 704 to perform the operations described herein. The storage 706 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raisable device that may, in an example, be configured to display braille or another physical output that may be touched to provide information to a user.

The input device 712 may include any of various devices that enable the computing device 702 to receive control input from users. Examples of suitable input devices 712 that receive human interface inputs may include keyboards, mice, trackballs, touchscreens, microphones, graphics tablets, and the like.

The network devices 708 may each include any of various devices that enable the described components to send and/or receive data from external devices over networks. Examples of suitable network devices 708 include an Ethernet interface, a Wi-Fi transceiver, a cellular transceiver, or a BLUETOOTH or BLUETOOTH Low Energy (BLE) transceiver, DSRC, C-V2X, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for utilizing local camera compute for camera calibration, comprising:
    a plurality of cameras, each of the cameras including a respective camera processor programmed to generate compressed images of raw images captured by the respective camera; and
    a camera controller, in communication with the plurality of cameras over a data connection, wherein:
        the camera controller is programmed to send a message over the data connection instructing the plurality of cameras to enter a calibration mode from a runtime mode,
        in the calibration mode, each of the plurality of camera processors is programmed to generate perception outputs indicating properties of a calibration reference located in a raw image captured by the respective camera and send, over the data connection to the camera controller, the compressed images and perception outputs indicating the features to the camera controller, thereby allowing the raw image data to be used for calibration without sending the raw image over the data connection to the camera controller, and the camera controller is programmed to receive the perception outputs from the plurality of cameras over the data connection,
        the camera controller is programmed to send a second message over the data connection instructing the plurality of cameras to enter the runtime mode from the calibration mode, and
        in the runtime mode, each of the plurality of camera processors is programmed to discontinue generating the perception outputs and send, over the data connection to the camera controller, the compressed images and the camera controller is programmed to utilize calibration data generated based on the perception outputs to fuse the compressed images into a combined surround view.

2. The system of claim 1, wherein the perception outputs include sub-pixel corner locations of corners of a checkerboard pattern of the calibration reference.

3. The system of claim 1, wherein the perception outputs include photometric color calibration information computed from the calibration reference.

4. The system of claim 1, wherein the camera processor is further programmed to locate the calibration reference in the raw image.

5. The system of claim 1, wherein the camera processor is further programmed to perform lens distortion correction at the camera.

6. The system of claim 1, wherein the data connection is an Ethernet bus.

7. The system of claim 1, wherein the combined surround view is a top-down view.

8. A method for utilizing local camera compute for camera calibration, comprising:
    sending a message from a camera controller to a plurality of cameras over a data bus, the message instructing the plurality of cameras to enter a calibration mode from a runtime mode;
    in the calibration mode, generating, by respective camera processors of each of a the plurality of cameras, perception outputs indicating properties of calibration references located in raw images captured by the respective camera, sending the perception outputs over the data bus to the camera controller without sending the raw images over the data bus to the camera controller; and receiving, by the camera controller, the perception outputs from the plurality of cameras;
    sending a second message from the camera controller to the plurality of cameras over the data bus, the second message instructing the plurality of cameras to enter the runtime mode from the calibration mode; and
    in the runtime mode, discontinuing generating the perception outputs, by the camera processors, and utilizing calibration data generated based on the perception outputs to fuse compressed images received from the plurality of cameras over the data bus into a combined surround view.

9. The method of claim 8, wherein the perception outputs include sub-pixel corner locations of corners of a checkerboard pattern of the calibration references.

10. The method of claim 8, wherein the perception outputs include photometric color calibration information computed from the calibration references.

11. The method of claim 8, further comprising locating the calibration references in the raw images using the camera processors.

12. The method of claim 8, further comprising performing lens distortion correction at the camera using the camera processors.

13. A camera utilizing local compute for camera calibration, comprising:
a camera processor programmed to:
receive, from the camera, raw images,
generate compressed images of raw images,
send the compressed images over a data connection to a camera controller,
receive a message over a data connection from the camera controller, the message instructing the camera processor to enter a calibration mode from a runtime mode,
in the calibration mode, locate a calibration reference in one or more of the raw images, identify features of the calibration reference, and send, over the data connection to the camera controller, perception outputs indicating the features to the camera controller, thereby allowing the raw image data to be used for calibration without sending the raw image over the data connection to the camera controller, receive a second message over the data connection from the camera controller, the second message instructing the camera processor to enter the runtime mode from the calibration mode, and in the runtime mode, discontinue generating and sending the perception outputs but continue sending the compressed images.

14. The camera of claim 13, wherein the features include sub-pixel locations of corners of a checkerboard pattern of the calibration reference.

15. The camera of claim 13, wherein the features include photometric color features of the calibration reference.

16. The camera of claim 13, wherein the camera processor is further programmed to include, in the perception outputs, photometric color calibration information computed by the camera processor from the calibration reference.

17. The camera of claim 13, wherein the camera is a wide-angle camera, and wherein the camera processor is further programmed to perform lens distortion correction at the camera using the camera processor.

* * * * *